Oct. 31, 1944. H. E. RADABAUGH ET AL 2,361,652

SOUND-ABSORBING CONTROL FOR ACOUSTICAL UNITS

Filed July 22, 1943

INVENTORS
Harold E. Radabaugh
Maurice E. Paquet
BY
Oliver B. Kaiser
Atty

UNITED STATES PATENT OFFICE 2,361,652

SOUND-ABSORBING CONTROL FOR ACOUSTICAL UNITS

Harold E. Radabaugh and Maurice E. Raquet, Cincinnati, Ohio

Application July 22, 1943, Serial No. 495,702

2 Claims. (Cl. 20—4)

The invention relates to improvements in sound deadening construction, embodying the use of foraminous or perforated sheets of stiff material for decorative purposes, providing a finished surface for the interior exposed side of wall, either as a side or ceiling wall, and a means for concealing, confining, and supporting sound absorbing material of a fibrous character insufficient to sustain itself.

The present invention contemplates the use of the conventional foraminous or perforated sheets, either of metal, compressed composition board, etc., commercially employed as a facing for sound absorbing material, and provides a finished or exposed surface for a wall either in panel or tile area dimensions for various style or decorative effects. The wall facing sheet is also referred to as a perforated rigid membrane. The perforations usually are distributed substantially uniformly over its area and symmetrical, and have a total area less than the unperforated area to avoid unduly weakening the sheet. The diameter of perforation and relative spacing is selective, and may vary to produce certain results and follow the standards most preferable and efficient for the class of installation contemplated; and, for example, conventionally the perforations are about $\frac{3}{16}$ inch in diameter, and on an average ½ inch apart, center to center.

Generally, the sound deadening construction may be said to comprise two elements, one a backing made of material having a high degree of sound absorbing efficiency, as bats of fiber, asbestos, glass or other materials, and the second a perforated facing made of material having a low degree of sound-absorbing efficiency, with the perforations usually limited to a size at which the sound-absorbing material will not project through and be visible from the face side.

The present improvement is directed to the provision of a third element to the combination, comparative to the perforated facing and companion therewith, movable for regulating and controlling the aperture area of the facing from its normal maximum to a complete closure of the apertures or perforations. This offers a material advantage for walls of radio broadcasting studios or rooms, for modifying the sound absorbability of the walls or sectional areas thereof.

In radio studios, it is often essential that the acoustical efficiency or sound absorbing qualities of certain portions of a room or areas be subject to increase or decrease in part or in whole.

The existing types of perforated acoustical treatments usually comprise units having a mechanical perforated surface which acts as a covering or facing for the sound absorbent material, or units which are mechanically perforated, the perforations extending into the sound absorbent material. Both of these acoustical units provide an unalterable maximum degree of sound absorption, of disadvantage for radio studios and similar enclosed spaces where microphonic pick-up is employed. Therefore, in many instances the maximum sound absorbing qualities of the walls are excessive and materially interfere with the microphonic transmission, and in particular, with musical sounds emitted from instruments which cannot be appropriately allocated to the microphone, necessitating undue maneuvering of apparatus and and of those taking part during the progress of a performance.

It is therefore an object of the invention to provide the individual perforated acoustical unit with means, regulatable for varying the degree of sound absorption, primarily in a reducing capacity, from the normal maximum, by reducing the perforation area or completely closing the same for either the entire wall or walls or sections thereof.

Further objects and advantages will be apparent from the following description of the drawing accompanied herewith and illustrating a preferred embodiment of the invention, in which.

Figure 1:
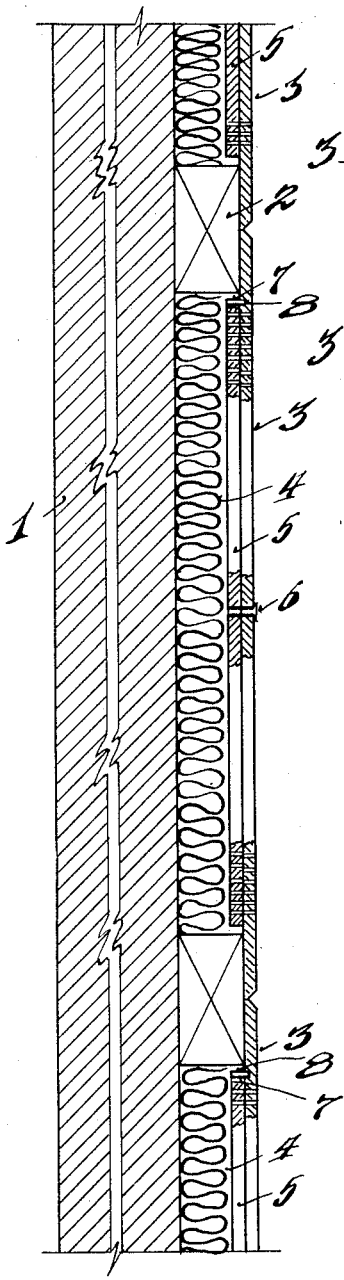
Figure 1 is a section through a wall or ceiling of a room acoustically treated and containing the improved means for regulatably varying the degree of sound absorption.
Figure 2:
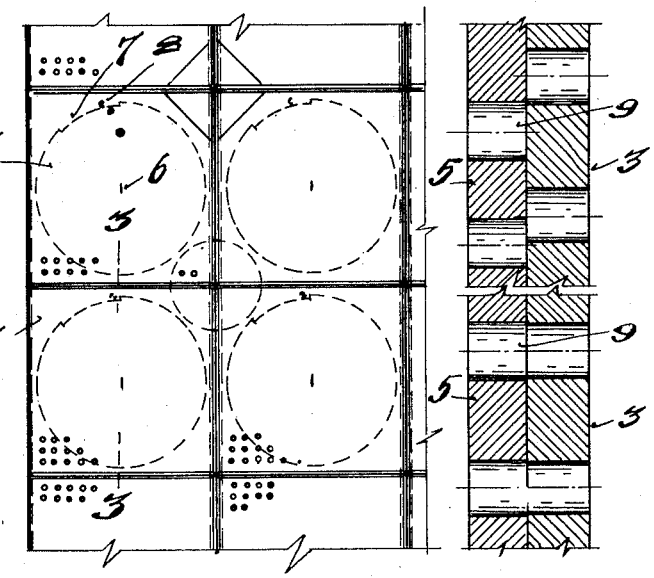
Figure 2 is a plan view of the face side of a section of a wall or ceiling.
Figure 3:
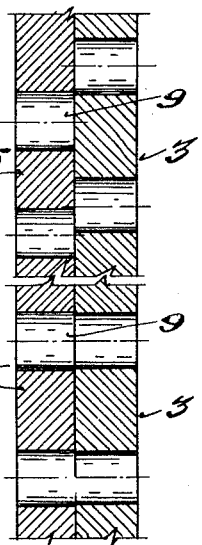
Figure 3 is an enlarged section on line 3—3, Figure 2.
Figure 4:
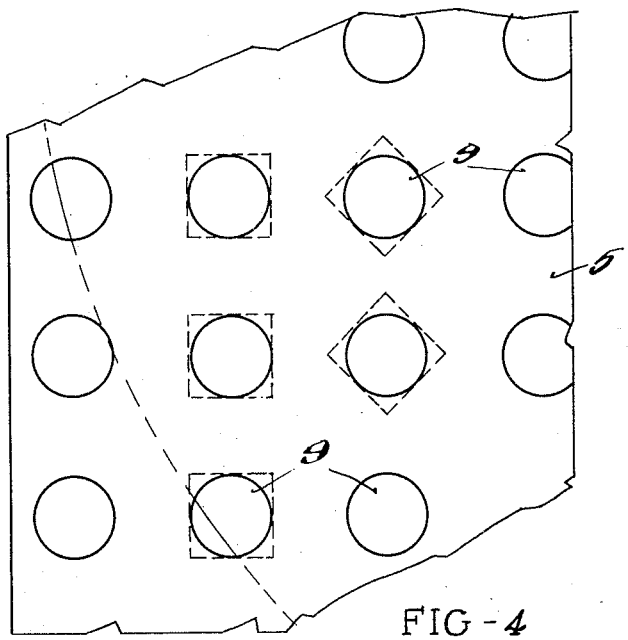
Figure 4 is an enlarged plan view of a section of the regulator plate, showing an exaggeration of the size of aperture and relative spacing.

Referring to the drawing, 1 indicates the framework of a wall or ceiling of conventional construction, which in detail may vary to meet different architectural methods and need not be further exemplified herein.

The wall as a part of its structure is provided with a suitable arrangement of furring strips 2, to which the perforated rigid facing or tiling sheets 3 are secured. The perforated rigid sheet material constitutes a commercial commodity, as a metal or a hard pressed composition material, in standardized or special sizes, with beveled or otherwise finished edges for different decorative possibilities and usually substantially flat face surfaces.

The size of perforation and relative spacing of the perforations have also been a factor in the development and manufacture of the rigid facing sheets.

As the present improvement contemplates the use of the available commercial sheets no specific description as to the material component nor process of manufacture will be made herein. For exemplification, the perforations are approximately $\frac{3}{16}$ inch in diameter and an average spacing of ½ inch apart, center to center.

The perforated rigid facing sheets usually are of rectangular form in outline, primarily for convenience in installation and which also is subject to modification.

The facing sheets 3 are secured to the furring strips or other types of supports in any efficient manner and the wall spacing at the rear side of the sheets is filled with any suitable type of sound absorbing material 4, as for instance balsam, glass wool or other fibrous material compact in place with the facing sheet or tile serving as a perforated screen to conceal the sound-absorbing material and as a support therefore. The sound-absorbing material may also be in bat form, prefixed within the furring spacing in the case of a ceiling treatment. The application of the sound-absorbing material may follow any conventional practice most adaptable for the nature of the material employed.

To vary or regulate the degree of sound absorption of the wall or sound-absorbing unit, comprising the sound-absorbing material and its confining and concealing thin layer of self-sustaining non-sound-absorbing perforated sheet or laminate having a maximum degree of sound absorption, a second perforated sheet or plate 5 is movably or rotatably interposed or incorporated intermediate the sound-absorbing material and facing sheet. The aperture control member or regulator 5, as illustrated, is in the form of a circular disk, lying adjacent thereto by a pin 6. The pin 6 is fixed to the control disk and accessible from the face side of the facing sheet 3 for manually rotating the disk. The disk is of the same material as the facing sheet, and of a diameter to cover a maximum area thereof as exposed between the furring strips and allow freedom of control rotation of the disk, excepting for a possible coverage and control of a limited number of apertures within the four corners of the rectangular facing sheet. The rotative disk form of regulator, and its control through the axis, facilitates the construction and assembly, effects convenience in operation with no possible weakening to the facing sheet, nor esthetical alteration from the face side.

As illustrated, the regulator 5 is limited to an arc of rotation of forty-five degrees by a notch 7 in the periphery to the disk traversed by a pin 8 fixed to and projecting from the rear side of the facing sheet or tiling 3.

The apertures 9 in the regulator 5 are arranged and spaced for registry with relative apertures in the facing sheet 3, and of a shape and size to offer no impedance to the continuation of the perforations or apertures in the fixed panel or facing sheets when the relative apertures of the two members are in registration. The apertures 9 are slightly in excess of the apertures in the facing sheet, and preferably for compressed material of square pattern as it provides the movement of a straight edge across the aperture controlled.

The relative movement of the perforated sheets for an opening control or regulation may be accomplished by other means or methods, as by transverse movement instead of rotation, although it is desideratum that the control feature be a simple structure, convenient in operation, and which will not materially increase the cost of an acoustical unit and installation.

It is also feasible to dispose the movable or aperture controlling element upon the outer side of the fixed element, if the decorative value is secondary. The facing and regulator sheets may both be referred to as of non-sound-absorbing material, either of the same or different kinds, with the size, number and spacing of the apertures when fully exposed or opened to the sound-absorbing material as a backing, determining the maximum efficiency and sound-absorbing qualities, and reduced to a degree proportionately to a regulatory closing of the apertures or openings.

The acoustical treatment, in accordance with the present improvement, may extend to a portion of one or more walls or ceiling of a room, and the term wall or ceiling is not used to give any limiting significance.

Having described our invention, we claim:

1. A sound-absorbing structure, comprising: a sound-absorbing material, a perforated rigid facing sheet for said sound-absorbing material and a second perforated rigid sheet mounted upon said facing sheet, the perforations through said sheets normally in registry and said second sheet movable to disregister the perforations for a closing and regulating control.

2. A facing for an acoustical wall or the like having a sound-absorbing material backing the facing, comprising: a pair of perforated rigid sheets in adjoining layer arrangement for aperture registration to permit the passage of sound waves therethrough to the sound-absorbing material, one thereof movable to interrupt the aperture registration for sound passage regulation and control.

HAROLD E. RADABAUGH.
MAURICE E. RAQUET.